Jan. 1, 1963 T. E. BJORN ET AL 3,071,007
UNBALANCE DETECTION APPARATUS
Filed Oct. 17, 1958 3 Sheets-Sheet 1

FIG. 1.

INVENTORS
THOMAS E. BJORN
PAUL C. HOSKING
OLEG SZYMBER

By John C Black
ATTORNEY

Jan. 1, 1963

T. E. BJORN ET AL 3,071,007

UNBALANCE DETECTION APPARATUS

Filed Oct. 17, 1958

INVENTORS
THOMAS E. BJORN
PAUL C. HOSKING
OLEG SZYMBER

BY John C. Black
ATTORNEY

United States Patent Office 3,071,007
Patented Jan. 1, 1963

3,071,007
UNBALANCE DETECTION APPARATUS
Thomas E. Bjorn, Waukegan, Paul C. Hosking, Wilmette, and Oleg Szymber, Wood Dale, Ill., assignors to Stewart-Warner Corporation, Chicago, Ill., a corporation of Virginia
Filed Oct. 17, 1958, Ser. No. 767,921
13 Claims. (Cl. 73—466)

This invention relates generally to apparatus for detecting unbalance in rotating bodies and more particularly to portable apparatus for determining the speed of rotation of a body being checked for unbalance and for determining the amount and the location of unbalance in the body.

Certain of the very early prior art equipment generally of this type was characterized by tunable electronic circuitry for separating the forces of vibration of the various rotating elements in complex machines. In such equipment, the mechanical pickups were sensitive to all of the vibrational forces in the machine. The separation of the vibrational forces was then accomplished in purely electronic circuits.

The use of purely electronic circuitry for separating the various vibrational forces resulted in complex and expensive apparatus which was subject to critical tuning problems. At the same time, such apparatus required bulkier and heavier constructions.

Subsequently, the pickups themselves were made adjustable in frequency response so that they could be tuned to detect only desired vibrational forces. The design of the requisite electronic circuitry became less critical with the introduction of tuned mechanical pickups.

However, the introduction of tunable mechanical pickup in turn introduced new problems, especially the problem of rapidly determining the frequency of the desired vibrational force.

The different machine elements operate at different frequencies to produce vibrational forces at those frequencies and at harmonics thereof.

Hence, it often occurs that several peaked vibrational forces are detected at frequencies both far from and near to the frequency of the desired vibrational force. Accordingly, the determination of which frequency is the desired one is a problem. Where the unbalance is small, the desired frequency can even be passed without detection. Also the time required for determining the desired frequency is unduly long.

Accordingly, it is a primary object of the present invention to provide an improved means in unbalance detection equipment for determining the desired frequency for detecting a vibrational force due to unbalance in a body. This means is characterized by a tunable vibrating reed-electromagnetic transducer pickup operatively connected in the plate circuit of an electronic tube to provide a broad band tunable oscillator, the output of which is used to control a stroboscopic device for determining quickly and accurately the rotational frequency of the body. The vibrating reed-electromagnetic transducer is then connected to other circuit means for more precise tuning of the apparatus to the rotational frequency and the vibrational forces at that frequency. Thus, the mechanical pickup is rapidly and reliably pre-tuned by means of a stroboscopic device; and, then it is finely tuned with minimum effort and time.

It is a primary object of the present invention to provide portable unbalance detecting equipment which is extremely compact and light without sacrificing economy of construction or sensitivity of operation.

It is another object of the present invention to provide improved circuit means in portable unbalance detection apparatus resulting in improved sensitivity, mechanical pickup damping, and broad band response.

Another object is the provision of an improved pickup construction.

Another object is the provision of an improved pickup housing construction.

Other objects and various features will be evident upon a perusal of the following description in which:

The preferred embodiment of the present invention includes a pair of pickup units. These units are normally positioned remotely from each other to determine the amount of vibration at two positions along an element or to determine the amount of vibration of different elements without moving either pickup until balancing is completed. Each of the pickups comprise a vibrating reed having a permanent magnet at the free end thereof and a pair of coils within which the magnet oscillates. The oscillation of the magnet within the coils produces an A.C. voltage proportional to the intensity of vibration detected. The amplitude of this voltage is brought to a maximum by mechanically adjusting the vibrating reed frequency to correspond to the frequency of the rotating element which is being checked for unbalance.

In order to rapidly adjust the pickup reed to substantially the desired frequency, the coils are connected to the grid and anode of a triode to provide a variable frequency oscillator. The frequency of the oscillator will depend upon the frequency to which the reed is adjusted. The output of the oscillator is fed to a stroboscopic device by way of a pulse forming circuit. The frequency to which the reed is adjusted is rapidly varied until the body being checked for unbalance is caused to appear stationary by the stroboscopic device. By means of a switch, the pickup coils are disconnected from the triode and connected to an electronic circuit to operate an amplitude meter. The frequency of the vibrating reed, substantially preadjusted by the above step, is carefully adjusted to give maximum reading in the amplitude meter.

The preferred embodiment also includes a second meter for indicating the rotational speed of the body when substantially determined by the stroboscopic device and when more precisely determined by the amplitude meter.

The preferred embodiment also includes a damping control consisting of a variable resistance connected in shunt across the pickup coils. The action of this control is such that if the resistance is decreased, the damping action is increased by virtue of increased circulating eddy currents in the coils. The damping control prevents the vibrating reed member and its permanent magnet from mechanically engaging the pickup coils in the event of extreme amplitude vibrations.

Figure 1:
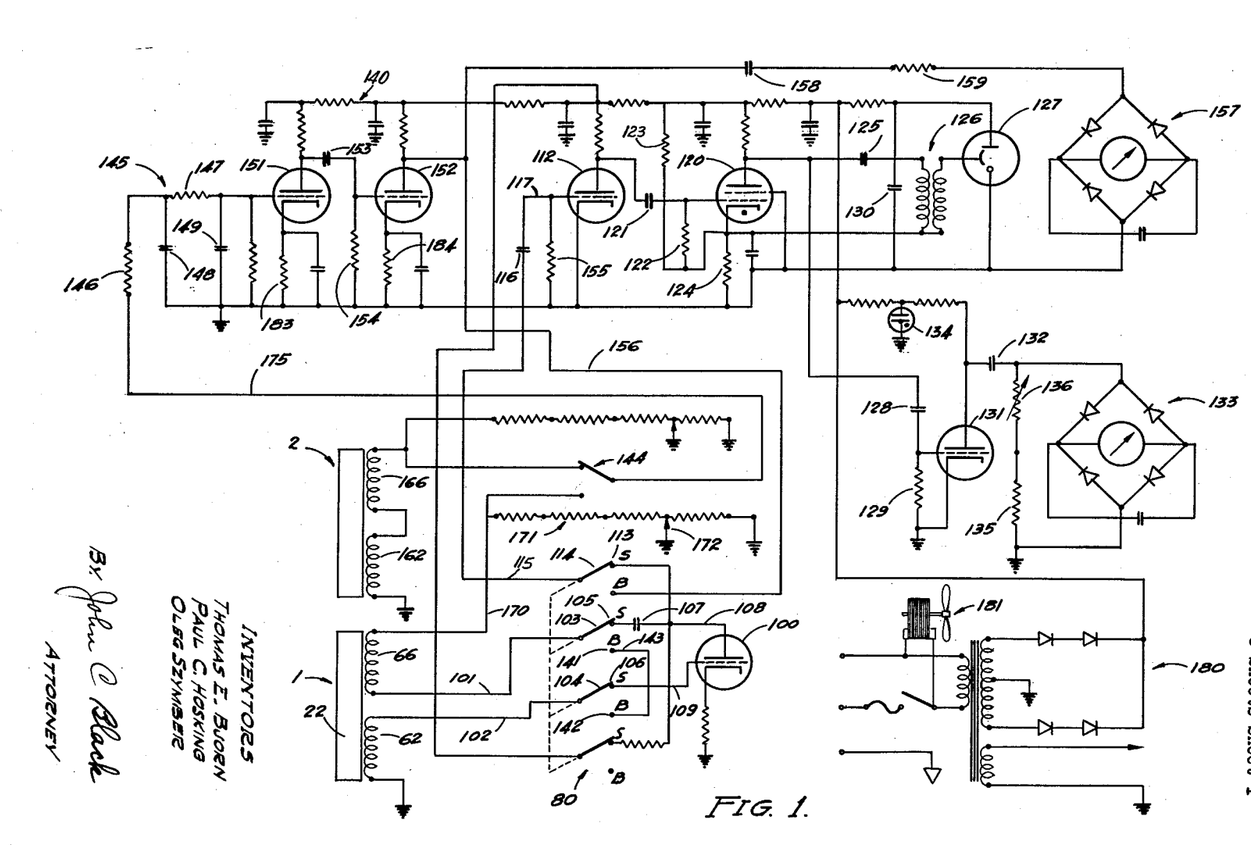
FIG. 1 is a schematic diagram of the apparatus.
Figure 2:
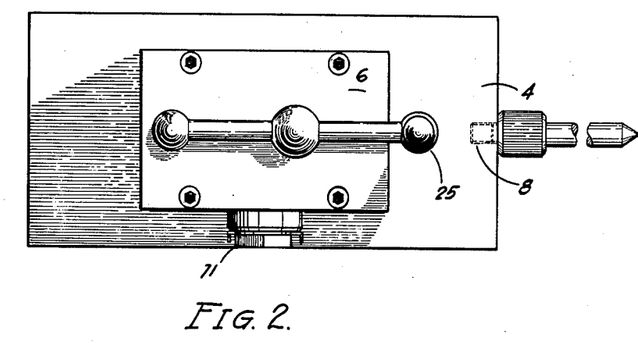
FIG. 2 is a plan view of the pickup housing.

More particularly, the pickups 1 and 2, shown diagrammatically in FIG. 1, are identical. The pickup unit assembly 1 comprises an aluminum case 3 (FIG. 3) including a generally rectangular stand 4, rectangular sides 5 and a cover 6. Four resilient pads 7 are secured to the lower corners of the stand 4 by means of screws (not shown). The central lower portion of the stand 4 is tapered from spaced longitudinal positions adjacent the pads upwardly and inwardly to a point at its longitudinal center to permit mounting on cylindrical surfaces. The pads 7 are utilized for mounting the assembly on flat surfaces. An adjustable screw 8 threaded into the stand is used as a probe to engage vibrating elements when the vibration cannot be picked up on a sufficiently large flat surface or on an easily accessible cylindrical surface.

Figure 3:
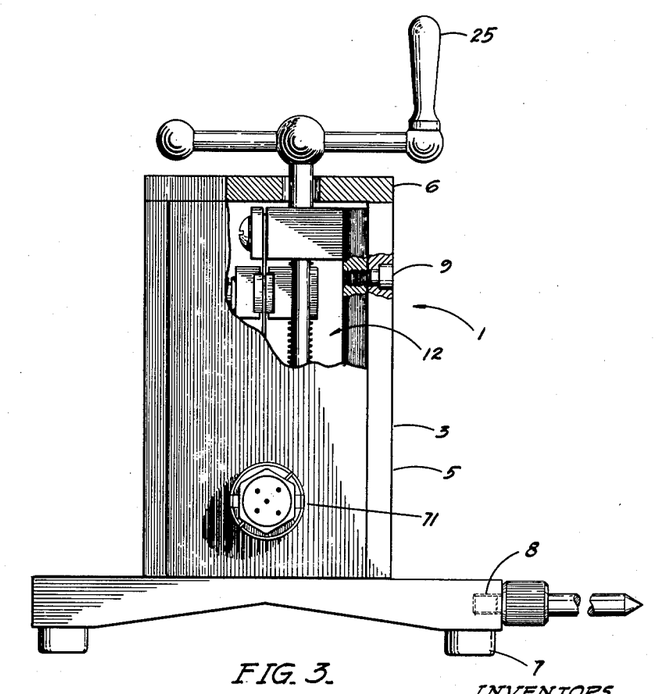
FIG. 3 is an elevation view, partially cut away, of the pickup and housing.

The pickup subassembly 12 is rigidly secured to the side wall 5 of the case 3 by means of a pair of machine screws 9. The pickup subassembly 12 includes a rectangular aluminum base 10. A coil assembly 11 is rigidly secured to the lower end of the base 10 by means of screws 13. A carriage assembly 14 is rigidly secured to the base 10 adjacent to and above the coil assembly 11.

The carriage assembly 14 includes a first generally rectangular steel support 15 secured to the base 10 immediately adjacent the coil assembly 11 by means of a pair of machine screws 16. The carriage assembly 14 also includes a second generally rectangular steel support 17 rigidly secured to the base 10 by means of a pair of spaced machine screws (not shown).

A vibrating reed assembly 18 is supported at the outer free end of the carriage support member 17 and extends downwardly into the coil assembly 11. The vibrating reed assembly 18 includes an elongated T-shaped reed 19 preferably of copper beryllium. The upper end of the T portion is held between the outer free end of the support member 17 and a matching cap 20. Said T portion includes a pair of apertures matching a pair of bores in the cap 20 and a pair of threaded bores in the member 17. A pair of screws 21 project through the cap and the reed and are threaded into the member 17 to rigidly support the reed. This construction forms the pivot point for the reed.

The other end of the reed assembly 18 includes a cylindrical bar magnet 22 received through an aperture in the reed in perpendicular relation thereto. The magnet 22 is firmly secured to the reed by means of a pair of brass bushings 23 pressed on the magnet from opposite ends and brought to tight engagement with opposite surfaces of the reed.

Figure 4:
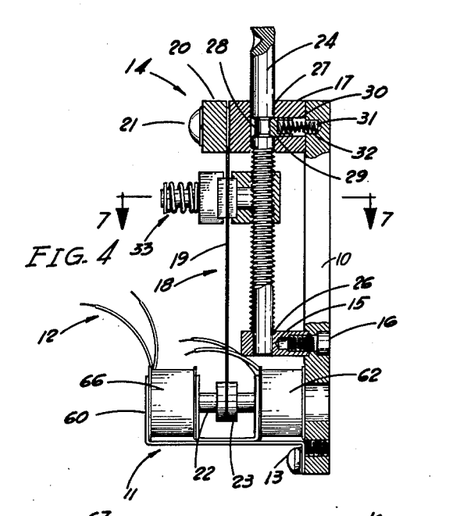
FIG. 4 is a sectional elevation view of the pickup.
Figure 5:
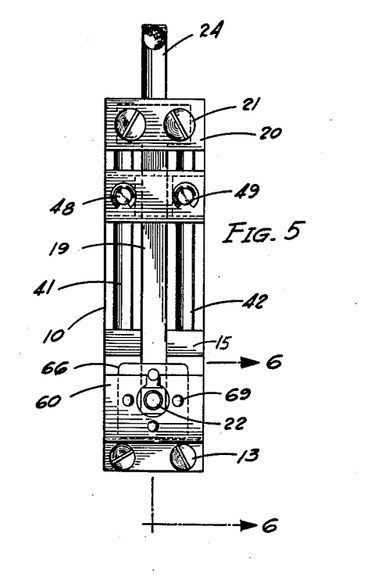
FIG. 5 is an elevation view of the pickup in a plane normal to the plane of FIG. 4.

The carriage assembly support members 15 and 17 support an elongated screw 24 which has one end thoroughly secured to an adjusting handle 25 (FIG. 3). The opposite end of the screw 24 is necked down and rotatably received in a bore 26 in the member 15 (FIG. 4). The member 15 thus provides a bearing support for the screw. A central portion of the screw is received through a central bore 27 in the support member 17. The member 17 thus provides a second bearing surface for the screw. The screw is threaded between its two bearing surfaces.

The screw 24 is necked down at 28 intermediate the ends of the support member 17 to provide opposed truncated conical surfaces with a cylindrical section therebetween. A generally cylindrical guide 29 is received in a bore 30 in the support member 17 perpendicular to and intersecting the bore 27 and the screw 24. One end of the guide 29 is tapered to form a truncated conical surface which may be urged into engagement with a necked-down portion of the screw 24 to prevent end play therein. The guide 29 is urged into yieldable engagement with the necked-down portion of the shaft 24 by a helical spring 31 which bottoms in a bore 32 in the base 10 thereby assuring accurate and locking positoning of the shaft 24.

Figure 7:
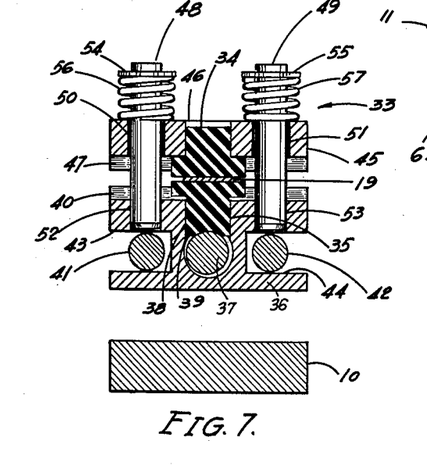
FIG. 7 is a sectional view along line 7—7 of FIG. 4.

The threaded portion of the screw 24 supports an assembly 33 which varies the natural frequency of vibration of the reed 19 by shortening and lengthening the free portion thereof. The assembly 33 includes a pair of nylon blocks 34 and 35 (FIG. 7) with flat rectangular head sections in engagement with opposite surfaces of the reed 19. The opposite ends of the blocks 34 and 35 are necked-down to present cylindrical surfaces.

The block 35 is received in a guide member 36. The member 36 includes a threaded bore 37 through which the screw 24 is received. Thus, the screw will support the guide member 36 between the support members 15 and 17. The member 36 may be moved axially along the screw by turning the handle 25. Rotation of the guide member 36, when the screw is rotated, will be prevented by structure which will be described later.

The guide member 36 includes a central bore 38 perpendicular to and intersecting the threading bore 37 in which the screw 24 is received. The cylindrical portion of the block 35 is received in the bore. The end 39 of the block 35 is provided with an arcuate recess which engages the screw 24 to minimize play between the screw and the member 36. The guide member 36 is also provided with an elongated rectangular slot 40 perpendicular to the axis of the screw 24 to receive the rectangular portion of the block 35.

A pair of elongated shafts 41 and 42 (FIG. 7) are carried by the support members 15 and 17 parallel to and spaced from the screw 24 on either side of the screw. The outer ends of the guide member 36 include generally rectangular recesses 43 and 44 through which the guide shafts 41 and 42 are received. The shafts and the guide member recesses are provided with a snug fit so that the guide member is held firmly in place on the screw 24 with little or no relative angular movement. Thus, the guide member 36 being confined angularly will move axially along the screw 24 when it is rotated by the handle 25.

The block 34 is received in a second guide member 45. The cylindrical end portion of the block 34 is received in a central bore 46 in the guide member 45. The guide member 45 is provided with a rectangular slot 47 for receiving the rectangular end portion of the block.

The guide members 36 and 45 are held together by means of a pair of dowel pins 48 and 49 which are slidingly received through spaced apertures 50 and 51 in the member 45 on either side of the block 34 and which are pressed into spaced bores 52 and 53 in the member 36. The outer free ends of the dowel pins 48 and 49 include circumferential grooves which receive C-washers 54 and 55. Helical springs 56 and 57 are disposed around the dowel pins 48 and 49 and are retained between the washers 54 and 55 and the outer surface of the guide member 45. The springs 56 and 57 resiliently urge the guide member 45 and the block 34 toward the reed 19, block 35 and member 36.

Thus, it can be seen that the blocks 34 and 35 will firmly engage and retain any portion of the reed 19 by moving the assembly 33 axially along the screw 24. By retaining the reed at different points along its length, the natural frequency of the reed will be varied.

Figure 6:
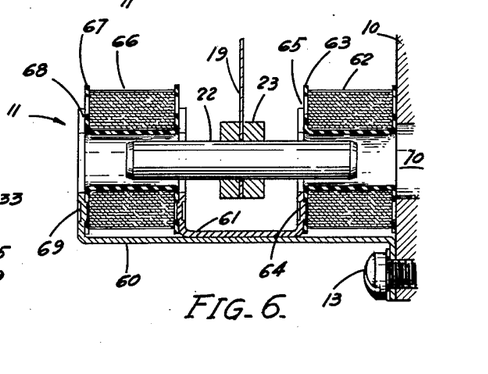
FIG. 6 is a sectional view of the electro-magnetic transducer along line 6—6 of FIG. 5.

The coil assembly 11 includes a brass S-shaped bracket 60 (FIG. 6) which is secured by screws 13 to the base 10. A generally U-shaped brass bracket 61 is rigidly secured to the central portion of the bracket 60 spaced from the base 10. A coil 62 wound on a nylon bobbin 63 is firmly retained between one side of the bracket 61 and the base 10. Three angularly spaced bracket tabs 64 are received in apertures 65 in the bobbin 63 to properly position the bobbin. The engaging surfaces of the base, the bobbin, and the bracket 61 are cemented together.

A coil 66 wound on a bobbin 67 is retained between the other side of the bracket 61 and the upper end 68 of the bracket 60. Tabs 69 in the brackets 60 and 61 retain the bobbin 67 in its proper position. The engaging surfaces of the bobbin and brackets are cemented together.

The brackets 60 and 61 and the bobbins 63 and 67 include central apertures for receiving opposite sides of the magnet 22. Thus, when the reed 19 vibrates the magnet may reciprocate back and forth within the coils 62 and 66. Reciprocating motion of the magnet within the coils will cause voltages to be induced in the coils in accordance with the deflection of the magnet and the frequency of deflection. Electric connections to the coils may be made by means of conventional wiring through the aperture 70 in the base 10 which is in alignment with the socket 71 in the side of the case 3.

The theoretical description of the operation and interaction of the various electro-mechanical and electronic apparatus are offered herein by way of explanation only; and, the applicant does not wish to be bound thereby.

The circuit of FIG. 1 will now be described. The apparatus includes a two position switch 80 which permits the pickup 1 to detect vibration and produce voltages in accordance therewith or alternatively to control a stroboscope. The latter operation will be descibed first. The pickup 1 may be held in the operator's hand for the stroboscope operation.

In the "strobe" position S of the switch 80, the two pickup coils 66 and 62 are connected respectively to the anode and grid circuit of a triode vacuum tube 100 by means of conductors 101 and 102, switch armatures 103 and 104, contacts 105 and 106, capacitor 107, and conductors 108 and 109. Coil 66 is also connected to ground by way of a conductor 170 and a potentiometer 171, the purpose of which will be described later. Initial motion of the magnet 22 will in all instances be caused by a slight mechanical shock and/or vacuum tube "noise." For example, if mechanical shock causes movement of the magnet, a voltage will be induced in the coil 62 connected to the grid of tube 100. A voltage will be applied to the grid causing a change in the conducting state of the tube. This change will be reflected back into the other pickup coil 66 by way of the blocking capacitor 107. The current induced in coil 66 will produce magnetic flux which will draw the magnet into the coil. The gain of the tube will cause this magnetic flux to be greater than the magnetic flux which induced the voltage in the first pickup coil 62. Hence, the motion of the magnet will be amplified. This amplified motion will cause a greater voltage to be induced in coil 62; and this cycle of operation will rapidly cause the oscillation of the triode and the magnet to increase until a state of equilibrium is reached. The frequency of oscillation of the triode output and the magnet will be controlled directly by the natural frequency of the vibrating reed as determined by its instantaneous setting.

The voltage output of the triode 100 is amplified by the triode 112 and its associated circuit. The plate of the tube 100 is connected to the grid of tube 112 by way of conductor 108, contact 113, armature 114, conductor 115, blocking capacitor 116, and conductor 117. This amplified voltage output of tube 112 is used to control a thyratron 120. The output of the amplifier tube 112 is connected to the thyratron 120 by way of a differentiating circuit comprising a capacitor 121 and a resistance 122. The differentiating circuit shapes the output pulses of the amplifier into sharp pulses in a well known manner to properly fire the thyratron 120.

The thyratron 120 is normally held in a non-conducting state by virtue of a fixed negative suppressor grid bias developed across a resistance 124 of a voltage dividing circuit comprising resistances 123 and 124. The control grid is normally maintained at cathode potential. The half cycle output of the amplifier 112 which produces a positive voltage across the resistance 122 biases the grid of thyratron 120 above cutoff to cause the thyratron to fire. At the end of this firing half cycle, the thyratron bias returns below cutoff and the thyratron is extinguished due to its low plate voltage.

A pulse initiating capacitor 125 connected in the plate circuit of the thyratron 120 fully charges itself during periods of non-conduction by the thyratron. At the same time, a supply capacitor 130 is fully charged with positive and negative supply potentials connected to its plates. When the thyratron fires as described above, the capacitor 125 discharges through the thyratron and the primary of a pulse transformer 126 to induce a high peaked voltage in the secondary of the transformer. This pulse is applied to the control element of a stroboscopic device 127 to cause the gas therein to ionize. The supply capacitor 130 discharges through the device 127 to produce a brilliant, high intensity short time duration flash of light.

The circuits described above for operating the stroboscopic device 127 are an improved form and are further described and claimed in U.S. Patent No. 2,955,232 issued to T. E. Bjorn and O. Szymber. Thus any one of several circuits well known in the art may be utilized in the present apparatus in place of the specific disclosed circuit defined by thyratron 120, capacitors 125 and 130 and their related circuit elements.

At the same time, conduction of the thyratron 120 will cause the capacitor 128 to discharge through grid resistor 129. This discharge will cause a negative pulse to be applied to the grid of a switching triode 131. The pulse will drive the triode from saturation to cutoff. Driving the switching triode from saturation to cutoff will cause the capacitor 132 to charge and discharge through a meter 133 which indicates the instantaneous frequency of the pickup 1. Since the meter 133 indicates instantaneous frequency it will be referred to hereinafter as a tachometer.

The capacitor 132 in the plate circuit of the triode 131 charges through the tachometer 133 and its associated balanced bridge while the triode is non-conducting with the capacitor plates connected across a gaseous discharge voltage regulator 134. The regulator normally maintains a constant predetermined maximum voltage across itself, which voltage is impressed across the plate of the capacitor 132.

When, subsequent to the end of the discharge of the capacitor 128, the triode 131 again conducts, the capacitor 132 discharges at least partially through the tachometer 133. Since the triode 131 operates at saturation a constant predetermined minimum voltage is maintained across the triode.

Hence, with each pulse from the thyratron 120, the capacitor 132 charges and discharges causing two pulses to be fed to the tachometer 133. Due to the action of the voltage regulator 134 and the saturable triode 131, these pulses are independent within limits of the signal strength of the thyratron and of variations in the voltage supply.

Resistances 135 and 136 shunt the tachometer 133 and may be adjusted to fix the tachometer range.

When it is desired to determine the presence and amount of unbalance in a rotating member of a machine being checked for unbalance, the switch 80 is operated to its "balance" position B. In this position the oscillator tube 100 is disconnected from the pickup unit 1. Also the input to the amplifier 112 is switched from the output of the oscillator tube 100 to the output of an amplifier 140 which is connected, as will be described below, to the pickup unit 1. It will be appreciated that either one or both of the pickups may be used for determining the presence or absence of deflection caused by unbalance in one or more planes. However, inasmuch as the operation of both pickups is identical, only pickup 1 will be described.

Thus the pickup unit switch 80 will be placed in its lower position (FIG. 1) to connect the coils 62 and 66 in series with each other by way of conductors 101 and 102, armatures 103 and 104, contacts 141 and 142, and conductor 143. The pickup unit switch 144 is operated to its lower unit 1 position to connect coil 66 to a pair of series connected low pass filters 145 comprising resistors 146 and 147 and capacitors 148 and 149 by way of conductors 170 and 175.

The pickup 1 is placed on the machine being checked for unbalance as close as possible to the particular shaft or rotating body to which the pickup has been tuned as described above. The vibration from the part being checked will be transmitted to the machine part on which the pickup is placed with only slight diminution in intensity.

The vibrating reed 19 of the pickup 1 oscillates in synchronism with the vibrations. It will be appreciated that the amount of deflection of the reed will be dependent at least in part upon the intensity of the vibration of the part. Hence, the amount of vibratory movement of the magnet 22 at the end of the reed 19 will be proportional to the intensity of the part vibrations.

However, the amplitude of the voltage induced in the coils 62 and 66 of the pickup 1 will be proportional to the amplitude and frequency of the reciprocating magnet. As the frequency of vibration varies, the velocity and acceleration of the magnet varies proportionally. It is well known that changes in velocity and acceleration of the magnet cause corresponding changes in the amplitude of the generated signal. It is desirable to provide a voltage which is affected only by the amplitude of vibration of the magnet 22 and is insensitive to the differing velocity and acceleration of the magnet at differing frequencies. If we can compensate for the change in amplitude of the induced voltage caused by changes in the velocity and acceleration of the magnet at different frequency, then a linear output corresponding to amplitude alone can be obtained over an extended frequency range. This is a desirable feature in unbalance detecting equipment. It has been found that the pair of series connected low pass filters described above compensates to a substantial degree for the changes in voltage produced by changes in frequency over the desired range of operation.

The output of the low pass filters 145 is connected to the input of a cascaded voltage amplifier comprising triodes 151 and 152. The triode amplifiers 151 and 152 are coupled by a capacitor 153 and a resistance 154 which have a very high time constant in order to minimize phase shift as the frequency varies. As the frequency of the signal increases, the reactance of the capacitor 153 decreases while the resistance of element 154 remains constant. Hence the phase angle of the effective impedance of the circuit varies accordingly. By using a relatively high value of capacitance in the element 153, we maintain this change in the phase angle at a minimum.

The triodes 151 and 152 have high bias resistances 183 and 184 in their cathode circuits to prevent their operation at saturation incident to unusually high amplitude input signals. These cathode resistances produce a high negative bias to prevent saturation of the tubes incident to input signals. It will be appreciated that, if the tubes are operated at saturation, the amplitude meter will not correctly indicate the amplitude of the vibrations.

The output of the amplifier 152 is connected to an amplitude meter 157 by way of a D.C. blocking capacitor 158 and a resistance 159. The meter 157 is similar to the tachometer 133 in that it includes a full wave rectifier bridge and filtering capacitor.

The output of the amplifier 152 is also connected to the input of the amplifier 112 by way of conductor 156, armature 114 of the switch 80 in its lower position, and conductor 115. Hence, the output from the amplifier 152 will be amplified by amplifier 112. The output of amplifier 112 will again be highly peaked by the capacitor 121 and resistance 122 to operate the thyratron 120 to cause the operation of the stroboscopic device 127 and the tachometer 133 as described earlier.

A conventional power supply 180 (FIG. 1) is provided for the circuit of the apparatus. A fan 181 is provided for cooling the electronic components.

A damping control consisting of a potentiometer is connected in shunt across the coils of each pickup 1 and 2. Thus, the potentiometer 171 (FIG. 1) is connected to the upper terminal of coil 66 by conductor 170 and to ground. The potentiometer 171 includes a contact 172 movable to a plurality of positions to vary the resistance of the potentiometer. It will be appreciated that an infinitely variable rheostat can be used.

With the switch 80 in the strobe position, the potentiometer 171 is in series with the coil 66 in the plate circuit of the oscillator 100. Hence, the current flowing through the coil can be increased or decreased by decreasing or increasing the resistance of the potentiometer. With the switch 80 in the balance position, the potentiometer is connected across the output of the coils 66 and 62. Hence, the current through the coils provided by any given induced voltage can be increased or decreased by decreasing or increasing the resistance of the potentiometer.

The function of the damping control potentiometer 171 is two-fold—to provide a sensitivity control for the apparatus and to prevent mechanical interference between the magnet 22 or vibrating reed 19 and the coil assembly 11 when the pickup 1 is driven to extremely large amplitudes.

With regard to the latter function of the damping control set forth above, it will be appreciated that in the event of unusually large vibrational forces of unbalance, the excursion of the vibrating reed 19 may become sufficiently high to cause the magnet 22 or the reed to engage the coil structure 11. This in turn will cause erroneous indications in both amplitude and speed of rotation. It will be recalled that the current induced in the coils 62 and 66 by the magnet 22 can be increased by decreasing the resistance of the potentiometer 171. Increased current in the coils will produce a magnet field which coacts with field of magnet 22 to produce damping of the amplitude of excursion of the magnet. The resistance of potentiometer is reduced sufficiently to effectively reduce the mechanical excursion of the magnet to a point below that at which the magnet and/or reed will engage the coil structure.

The above damping control is provided when the apparatus is being used to determine the amount and location of unbalance. Hence, the switch 80 is in the balance position B and the output of the coils 62 and 66 are connected to the amplitude meter 157, the tachometer 133, and the stroboscopic device 127 by way of circuits described above. Unduly high voltage outputs from the coils 62 and 66 will cause the amplitude meter to read off scale in which instance it would not be possible to detect the relative amplitude of the vibrational force. When the damping control potentiometer 171 is adjusted to reduce the excursion of the magnet 22 as described above, the voltage induced in the coils 62 and 66 will be decreased. Hence, the output of the coils 62 and 66, which is fed to the amplitude meter and the tachometer, is reduced. During actual operation, the potentiometer 171 is preferably adjusted to provide substantially a three-quarter scale deflection of the amplitude meter, which condition is indicative of the optimum operation of the amplifiers 151 and 152.

Obviously, the tachometer 133 is insensitive to the amplitude of the output of coils 62 and 66. However, adjustment of the potentiometer 171 as described above assures optimum operation of the amplifier 112 and the thyratron 120 which control the tachometer and stroboscopic device.

It will be appreciated that, as additional weights are added to bring the body closer to balance, the output of the pickup will correspondingly fall. As the output of the pickup decreases, the indication of the amplitude meter will also decrease. In order to maintain a reading of the amplitude meter at an optimum level as the body approaches a balanced condition, the value of the damping control resistance may be increased thereby to increase the output of the pickup. Increased pickup output will increase the reading of the amplitude meter. Thus the reading of the amplitude meter may at all times be maintained at a reasonable value for determining the amount of unbalance. In apparatus of this nature, there is always a limit beyond which the presence of unbalance cannot be detected. In the particular apparatus disclosed herein, it has been possible to detect and correct forces of unbalance producing as little as .000007 inch deflections.

During the rapid pre-adjustment of the pickup 1 with the switch 80 in the strobe position, the potentiometer 171 may be adjusted to provide sufficient gain to the oscillator circuit defined by the pickup 1 and the tube 100 to assure proper operation of both the stroboscopic device 127 and the tachometer 133 by the amplifier 112 and the thyratron 120.

The operation of the apparatus will now be described in detail. Suitable connections are made to the power supply and the armatures of switch 80 are operated to their upper (FIG. 1) strobe position S. The operator will hold the pickup unit 1 in his hand and the armature of the switch 144 may be in its lower or upper (FIG. 1) position. It is preferable that the switch be in its upper position, however, during the pretuned operation to prevent pickup of the oscillator signal in the amplifier circuit 140. Slight vibration in the pickup unit 1 and/or noise in the oscillator tube 100 will initiate the operation of the oscillator circuit defined by the pickup unit 1 and the tube 100. The signal level of the oscillations rapidly build up to a maximum.

The output of the oscillator circuit will be fed to the amplifier 112. The output of the amplifier 112 will be sharply peaked by the capacitor 121 and the resistance 122 to fire the thyratron 120 at the frequency of the vibrating reed 19 of the pickup 1. The thyratron 120 will cause the intermittent operation of the stroboscopic device 127 at the same frequency and will cause the tachometer 133 to indicate said frequency.

The handle 25 (FIG. 3) of the pickup 1 will be rotated rapidly by the operator to move the assembly 33 to vary the frequency of the vibrating reed 19 and its magnet 22. Accordingly, the output of the pickup 1 and the oscillator tube 100 will vary with the frequency of the reed 19. This will in turn correspondingly vary the input and the output signal frequencies of the amplifier 112 and the thyratron 120. The frequency of operation of the stroboscopic device 127 will follow the frequency of the output of the thyratron 120.

In this manner, the operator can vary the frequency of the apparatus very rapidly until the stroboscopic device 127 appears to stop the motion of the part being checked for unbalance. At this time the operator will adjust the handle 25 of the pickup 1 very carefully to provide, as accurately as possible, operation at the frequency of the part being checked. The operator will then place the pickup 1 on, or as close to, the part as is possible and move the armatures of the switch 80 to their lower balance position B. The oscillator tube 100 is thereby disconnected from the pickup 1, and the pickup 1 will be caused to vibrate by unbalance in the part. If the amount of unbalance is sufficiently large to be detected, the signal output of pickup unit 1 will be sufficiently large when amplified by tubes 151 and 152 to produce a reading by the amplitude meter 157.

In the event that the amount of unbalance in the part is small but detectable, the potentiometer 171 will be adjusted to its maximum resistance position to provide as little damping as possible and accordingly the highest possible signal output of the pickup unit 1. The handle 25 will be moved in both directions very carefully by the operator as he observes the effect of such movement on the reading of the amplitude meter 157. The handle 25 will be adjusted to a position in which maximum reading of the meter 157 is obtained, which position indicates that the apparatus is in perfect tuned relation to the vibrating part. In the event that the force of vibration due to unbalance in the part is large, the potentiometer 171 will be adjusted to a position in which the output of the pickup 1 causes substantially three-quarter scale deflection of the meter 157; and the apparatus is adjusted to the frequency of the part as described immediately above.

The rotating part will appear to be stationary due to the stroboscopic effect. The rotational position of a suitable identifiable mark on the part is noted. The part is stopped and a weight, sufficient in mass to affect a change in the amplitude of vibration due to unbalance, is suitably attached in any position on the part in the same plane as the pickup unit. A relatively small weight is preferable so as not to over-shadow the amount of unbalance. With continued experience with a given machine over a period of time, an operator will be able to evaluate with a considerable degree of reliability the approximate amount of weight which will provide correction.

The part is again rotated and the position of the mark is again observed. If the mark shifted rotationally in one direction, indicating that the weight has been placed in a position other than 180° from the center of unbalance, the part is stopped; and the weight is shifted in the opposite direction. This sequence of operations is continued until the mark again appears in the first noted position indicating that the location of the center of unbalance and the position for adding weight has been determined.

Again with experience on a given machine of the type disclosed herein, the operator will be able to select with a considerable degree of reliability the approximate position of the center of unbalance. This is due in part to the circuits associated with amplifiers 151, 153, and 112 which, as described above, minimize phase shift at different frequencies and which compensate for higher gain of the pickup 1 at higher frequencies.

As the weight is properly located, a decrease in the amplitude of vibration and a decrease in the meter reading 157 should be observed. The amount of the reduction in the meter reading will be a reliable indication of the relative amount of weight required for balancing. Now the amount of the weight is varied until no meter reading is observed with the potentiometer 171 in its highest resistance minimum damping position.

It will be noted that the exact speed of rotation on the part may be read from the tachometer 133 at any time after the meter 157 has been adjusted for maximum amplitude reading. The rotational speed of the part may then be recorded for future reference whereby the quick pre-tuning by the strobe can be eliminated, assuming that a suitable scale is provided for the pickup 1.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. In apparatus of the type in which a vibrating reed is tuned to the same frequency as vibrational forces due to unbalance in a rotating body and controls the relative movement of a magnet and at least one coil of an electromagnetic device to produce output signals in the coil at the same frequency to operate an amplitude meter and a stroboscopic device for determining the amount and location of the unbalance, the combination with the reed and the devices of a means for rapidly and reliably pretuning the reed to the rotational frequency of the body without the use of the vibrational forces comprising an electronic device including at least a control element and an output element, a second coil and the one coil in the electromagnetic device coupled respectively to the control element and the output element, whereby oscillating currents are sustained at the natural frequency of the reed in the coils and electronic device, means coupling the output of the one coil to the stroboscopic device to operate the latter device at the natural frequency of the reed, means for selectively decoupling said one coil from said output element and means for rapidly varying the natural frequency of the reed to vary the frequency of operation of the stroboscopic device.

2. In apparatus for detecting the amount and location of unbalance in a rotating body, the combination of a multi-element electronic device capable of oscillation, an electromagnetic generator comprising a pair of coils and a permanent magnet, circuits coupling one of the coils to the output element of the device and the other coil to a control element of the device, a vibrating reed structure supporting the magnet for generally reciprocable movement on a portion thereof free for vibration, whereby the generator and device oscillate at a frequency defined by the natural frequency of vibration of the reed, means for varying the effective length of the reed to vary its frequency of vibration, a stroboscopic device for visually stopping the body, electrical circuits for amplifying and shaping the output of the electronic device to operate the stroboscopic device at the frequency of the reed, whereby the frequency of vibration of the reed can be rapidly tuned to the rotational frequency of the body, a switch for disconnecting the coils of the generator from their respective coupling circuits, a pair of series connected low pass filters, means including the switch connecting the coils of the generator to the low pass filters for partially compensating for variations in the amplitude of the generator output signals caused by variations in signal frequency, a pair of cascaded electronic amplifiers connected to the output of the filters, a long time constant coupling between the amplifiers for minimizing phase shift at differing frequencies, an amplitude meter connected to the output of the final amplifier for indicating the amount of unbalance in the body, the amplifiers including a high cathode biasing resistance to prevent their operation at saturation incident to unusually high input signals, means including said switch connecting the stroboscopic device and its amplifying and shaping circuits to the output of the final amplifier.

3. In apparatus for detecting the location of unbalance in a rotating body, the combination of a multi-element electronic device capable of oscillation, an electromagnetic generator comprising a pair of coils and a permanent magnet, circuits coupling one of the coils to the output element of the device and the other coil to a control element of the device, a vibrating reed structure supporting the magnet for generally reciprocable movement on a portion thereof free for vibration, whereby the generator and device oscillate at a frequency defined by the natural frequency of vibration of the reed, means for varying the effective length of the reed to vary its frequency of vibration, a stroboscopic device for visually stopping the body, electrical circuits for amplifying and shaping the output of the one coil to operate the stroboscopic device at the frequency of the reed, and means for selectively decoupling at least said one coil from said electronic device whereby the frequency of vibration of the reed can be rapidly tuned to the rotational frequency of the body.

4. The combination claimed in claim 3 together with a variable resistance connected in shunt across the one coil for varying the intensity of the oscillations.

5. In apparatus for detecting the amount and location of unbalance in a rotating body, the combination of a circuit including an electronic tube having an anode, cathode, and control grid, an electromagnetic generator comprising a pair of coils and a permanent magnet, circuits coupling one of the coils to the anode of the tube and the other coil to the control grid of the device, a vibrating reed structure supporting the magnet for generally reciprocable movement on a portion thereof free for vibration, whereby the generator and tube oscillate at a frequency defined by the natural frequency of vibration of the reed, means for varying the effective length of the reed to vary its frequency of vibration, a stroboscopic device for visually stopping the body, electrical circuits for amplifying and shaping the output of the one coil to operate the stroboscopic device at the frequency of the reed, and means for selectively decoupling said one coil from the anode of said tube whereby the frequency of vibration of the reed can be rapidly tuned to the rotational frequency of the body.

6. In an electromagnetic pickup unit for unbalance detection apparatus of the type in which a vibrating reed is rigidly secured at one end thereof to a support structure and in which an electromagnetic device has at least one of its operative elements secured to the other free end of the reed to produce electrical signals incident to vibration of the reed at a frequency determined by the instantaneous natural frequency of the reed, the combination with the reed of a means for accurately varying the instantaneous natural frequency thereof comprising a pair of blocks engaging opposite sides of the reed in plane normal to the direction of the reed, a pair of guide members carrying the blocks, the support structure including a threaded element parallel with the reed, one of the guide members defining a threaded bore receiving and operatively engaging the threaded element, the block carried by said one guide member having a surface opposite the surface which engages the reed engaging the threaded element to minimize backlash between the element and guide member, means connecting and resiliently urging the other guide member and its block toward the one guide member and its block, means preventing substantial angular movement of the guide members about the reed, and means for rotating the threaded element thereby to advance the guide members and blocks along the length of the reed to vary its natural frequency.

7. In an electromagnetic pickup unit for unbalance detection apparatus of the type in which a vibrating reed is rigidly secured at one end thereof to a support structure and in which an electromagnetic device has at least one of its operative elements secured to the other free end of the reed to produce electrical signals incident to vibration of the reed at a frequency determined by the instantaneous natural frequency of the reed, the combination with the reed of a means for accurately varying the instantaneous natural frequency thereof comprising a pair of blocks having flat juxtaposed surfaces engaging opposite sides of the reed in planes normal to the direction of vibration of the reed, and having straight transverse edges on the sides facing the free end of the reed, a pair of guide members carrying the blocks, the support structure including three spaced elongated elements parallel with the reed, one of the elongated elements having a threaded portion, the guide members defining a threaded bore receiving and operatively engaging the threaded element, the one guide member defining slots slidably receiving the other elongated elements to prevent angular movement of the one guide member, the block carried by the one guide member having a curved threaded surface opposite the surface which engages the reed engaging the threaded element to minimize backlash between the element and guide member, means connecting and resiliently urging the other guide member and its block toward the one guide member and its block, means for rotating the threaded element thereby to advance the guide members and blocks along the length of the reed to vary its natural frequency.

8. In an electromagnetic pickup unit for unbalance detection apparatus of the type in which a vibrating reed is rigidly secured at one end thereof to a support structure and in which an electromagnetic device has at least one of its operative elements secured to the other free end of the reed to produce electrical signals incident to vibration of the reed at a frequency determined by the instantaneous natural frequency of the reed, the combination with the reed of a means for accurately varying the instantaneous natural frequency of the reed comprising a pair of blocks engaging opposite sides of the reed in planes normal to the direction of vibration of the reed and having straight transverse edges on the sides facing the free end of the reed, a pair of guide members carrying the blocks, the support structure including a threaded element parallel with the reed, one of the guide members defining a threaded bore receiving and operatively engaging the threaded element, the block carried by said one guide member having a surface opposite the surface which engages the reed engaging the threaded element to minimize backlash between the element and guide member, means connecting and resiliently urging the other guide member and its block toward the one guide member and its block, means preventing rotation of the guide members, means for rotating the threaded element thereby to advance the guide members and blocks along the length of the reed to vary its natural frequency, the support structure including spaced bearing means for rotatably receiving non-threaded portions of the threaded element, a circumferential recess on one portion of the threaded element, a guide having one end substantially conforming to the cross-section of the circumferential recess and resiliently urged into engagement with the recess surfaces for assuring accurate and locking positioning of the threaded element.

9. In an electromagnetic pickup unit for unbalance detection apparatus of the type in which a vibrating reed is rigidly secured at one end thereof to a support structure and in which an electromagnetic device has at least one of its operative elements secured to the other free end of the reed to produce electrical signals incident to vibration of the reed at a frequency determined by the instantaneous natural frequency of the reed, the combination with the reed of a means for accurately varying the instantaneous natural frequency of the reed comprising a pair of nylon blocks having flat juxtaposed surfaces engaging opposite sides of the reed in planes normal to the direction of vibration of the reed, a pair of guide members carrying the blocks, the support structure including three spaced elongated circular shafts parallel with the reed, one of the elongated shafts having a threaded portion, one of the guide members defining a threaded bore receiving and operatively engaging the threaded shaft, the one guide member defining slots slideably receiving the other elongated shafts to prevent angular movement of the one guide member, the block carried by the one guide member having a curved threaded surface opposite the surface which engages the reed engaging the threaded shaft to minimize backlash between the shaft and guide member, means connecting and resiliently urging the other guide member and its block toward the one guide member and its block, means for rotating the threaded shaft thereby to advance the guide members and blocks longitudinally along the length of the reed to vary its natural frequency, a supporting block for the threaded shaft and substantially perpendicular thereto, a circumferential recess on one portion of the threaded shaft, a guide having one end substantially conforming to the cross-section of the circumferential recess and resiliently urged into engagement with the recess surfaces for assuring accurate and locking positioning of the threaded shaft.

10. In apparatus for detecting the location of unbalance in a rotating body, the combination of an electronic device capable of oscillation and having a control element and an output element, an electromagnetic generator including a permanent bar magnet and a pair of spaced coaxial coils having axial openings for receiving the magnet, circuits coupling one of the coils to the output element of the device and the other coil to the control element of the device, a vibrating reed structure supporting the magnet between the coils for generally reciprocable movement in the coils energizing the generator and device for oscillation at the natural frequency of vibration of the reed, a stroboscopic device for visually stopping the body, circuit means coupled to the one coil for operating the stroboscopic device at the frequency of the reed, means for varying the effective length of the reed to vary its frequency of vibration to the rotational frequency of the body and means for selectively decoupling said one coil from the output element of said electronic device.

11. In apparatus of the type in which a vibrating reed is tuned to the same frequency as vibrational forces due to unbalance in a rotating body and controls an electromagnetic generator to produce output signals at the said frequency and in which circuit means are energized by the signals to operate an amplitude meter and a stroboscopic device for determining the amount and locus of the unbalance, the combination with the stroboscopic device of a self-energized electronic oscillator including the electromagnetic generator operated at the resonant frequency of the reed, and switching means for alternatively connecting the oscillator to the circuit means for rapidly pretuning the reed to the rotational frequency of the body independent of the vibrational forces and connecting only the generator to the circuit means while simultaneously disabling said oscillator for accurately tuning the reed to the exact frequency of the vibrational forces.

12. In apparatus of the type in which a vibrating reed is tuned to the same frequency as vibrational forces due to unbalance in a rotating body and controls the relative movement of a magnet and at least one coil of an electromagnetic device to produce output signals at the said frequency and in which circuit means are energized by the signals to operate an amplitude meter and a stroboscopic device for determining the amount and locus of the unbalance, the combination with the reed and the devices of an electronic device having at least a control element and an output element, a second coil in the electromagnetic device and the one coil coupled respectively to the control element and the output element, the second coil energized by signals in the output element to alternately attract the magnet away from the one coil and release the magnet for movement toward the one coil to generate signals applied to the control element of the electronic device for amplification, whereby oscillating currents are sustained at the natural frequency of the reed in the coils and electronic device, means coupling the output of said one coil to the circuit means, means for selectively decoupling said one coil from the output element of said electronic device and means for rapidly varying the natural frequency of the reed to vary the frequency of operation of the stroboscopic device.

13. A method for detecting and analyzing unbalance in a rotating body using a pickup unit having a mechanically vibratable element driving an electromagnetic generator, an amplitude meter and a stroboscopic device, comprising the steps: connecting the electromagnetic generator as a frequency determining element in an electronic oscillator and driving the stroboscopic device therefrom; varying the resonant frequency of the vibratable element until the light from the stroboscopic device stops the rotating body; mechanically vibrating the pickup unit responsive to vibrational forces due to the unbalance in the body, disconnecting the electromagnetic generator from the oscillator, applying the output from the generator to the strobe device; and varying the resonant frequency of the vibrating element until a maximum signal is obtained on the meter.

References Cited in the file of this patent

UNITED STATES PATENTS

| | | |
|---|---|---|
| 1,900,038 | Bower | Mar. 7, 1933 |
| 1,948,104 | Firestone et al. | Feb. 20, 1934 |

(Other references on following page)

UNITED STATES PATENTS

| | | | |
|---|---|---|---|
| 2,034,787 | Williams | Mar. 24, | 1936 |
| 2,243,457 | Esval et al. | May 27, | 1941 |
| 2,301,291 | Kolesnik | Nov. 10, | 1942 |
| 2,322,561 | Bevins et al. | June 22, | 1943 |
| 2,331,317 | Germeshausen | Oct. 12, | 1943 |
| 2,449,651 | Hathaway | Sept. 21, | 1948 |
| 2,521,141 | Allen | Sept. 5, | 1950 |
| 2,622,437 | Frank | Dec. 23, | 1952 |
| 2,711,647 | Ongaro et al. | June 28, | 1955 |
| 2,783,648 | Stovall et al. | Mar. 5, | 1957 |
| 2,816,445 | Rambo | Dec. 17, | 1957 |
| 2,823,544 | McCoy | Feb. 18, | 1958 |
| 2,946,218 | Karpchuk | June 26, | 1960 |

FOREIGN PATENTS

| | | | |
|---|---|---|---|
| 729,901 | Great Britain | May 11, | 1955 |